US009075701B2

(12) United States Patent
Yun et al.

(10) Patent No.: US 9,075,701 B2
(45) Date of Patent: Jul. 7, 2015

(54) APPARATUS AND METHOD FOR MONITORING ABNORMAL STATE OF VEHICLE USING CLUSTERING TECHNIQUE (71) Applicants: Electronics and Telecommunications Research Institute, Daejeon (KR); Chungbuk National University Industry-Academic Cooperation Foundation, Chungbuk (KR)

(72) Inventors: Un-Il Yun, Chungcheongbuk-do (KR); Shin-Kyung Lee, Daejeon (KR); Jeong-Woo Lee, Daejeon (KR); Oh-Cheon Kwon, Daejeon (KR); Gwang-Bum Pyun, Chungcheongbuk-do (KR); Heung-Mo Ryang, Chungcheongbuk-do (KR); Gang-In Lee, Chungcheongbuk-do (KR)

(73) Assignees: ELECTRONICS AND TELECOMMUNICATIONS RESEARCH INSTITUTE, Daejeon (KR); CHUNGBUK NATIONAL UNIVERSITY INDUSTRY-ACADEMIC COOPERATION FOUNDATION, Chungbuk (KR)

( * ) Notice: Subject to any disclaimer, the term of this patent is extended or adjusted under 35 U.S.C. 154(b) by 155 days.

(21) Appl. No.: 13/874,028

(22) Filed: Apr. 30, 2013

(65) Prior Publication Data
US 2013/0297141 A1 Nov. 7, 2013

(30) Foreign Application Priority Data
May 4, 2012 (KR) ........................ 10-2012-0047514

(51) Int. Cl.
| | |
|---|---|
| G06F 17/00 | (2006.01) |
| B60W 50/02 | (2012.01) |
| G06K 9/00 | (2006.01) |
| G06K 9/62 | (2006.01) |

(52) U.S. Cl.
CPC ........... *G06F 17/00* (2013.01); *B60W 50/0205* (2013.01); *G06K 9/00* (2013.01); *G06K 9/6272* (2013.01); *G06K 9/6223* (2013.01)

(58) Field of Classification Search
CPC ... G06F 11/0739; G06F 17/00; G06F 11/004; B60W 50/0205; G06K 9/6218–9/6226; G06K 9/6267–9/6276; G06K 9/00
USPC ....................................... 701/29.1, 31.9, 32.1
See application file for complete search history.

(56) References Cited

U.S. PATENT DOCUMENTS

| | | | |
|---|---|---|---|
| 2004/0117106 A1* | 6/2004 | Dudel et al. .................. | 701/115 |
| 2007/0250229 A1 | 10/2007 | Wu | |
| 2009/0254240 A1 | 10/2009 | Olsen, III et al. | |
| 2011/0313616 A1* | 12/2011 | Tsuchikiri et al. .............. | 701/35 |
| 2012/0134532 A1* | 5/2012 | Ni et al. ........................ | 382/103 |
| 2012/0277949 A1* | 11/2012 | Ghimire et al. .............. | 701/31.4 |

FOREIGN PATENT DOCUMENTS

| | | |
|---|---|---|
| KR | 10-2004-0033454 A | 4/2004 |
| KR | 10-0803292 B1 | 2/2008 |

OTHER PUBLICATIONS

Hongwei Liu et al., "Design of Remote Monitoring and Fault Diagnosis System for Electric Vehicle", International Conference on Electronic & Mechanical Engineering and Information Technology, Aug. 12-14, 2011, pp. 1079-1082.

Hillol Kargupta et al., "MineFleete®*: An Overview of a Widely Adopted Distributed Vehicle Performance Data Mining System", KDD'10, Jul. 25-28, 2010, Washington, DC, pp. 37-46.

Debopam Acharya et al., "Advances in Integrated Vehicle Health Monitoring Systems", Advances in Integrated Vehicle Health Monitoring Systems, Jul. 2011, pp. 32-37, vol. 5, Issue 3.

J. S. Lee et al., "Failure Forecasting Technology of Electronic Control System Using Automobile Input/Output Signal Detection", Journal of the Korean Society for Power System Engineering, Feb. 2009, pp. 59-64, vol. 13, No. 1.

\* cited by examiner

*Primary Examiner* — Fadey Jabr
*Assistant Examiner* — Courtney Heinle
(74) *Attorney, Agent, or Firm* — Rabin & Berdo, P.C.

(57) ABSTRACT

The present invention relates to an apparatus and method for monitoring abnormal state of a vehicle. In the method, CAN data collected from an ECU mounted on the vehicle is transformed into coordinates. The coordinates are applied to a distribution map in a specific space, a number of clusters is calculated based on results of the application, and an initial center point corresponding to the number of clusters is selected. Clustering is performed based on the initial center point, and then clusters are generated. At least one piece of data is extracted from each of the clusters, and a state feature of a corresponding cluster is decided on using a difference between maximum and minimum values of attributes constituting the at least one piece of data. A current state of the vehicle is monitored based on current CAN data of the vehicle and state features of the clusters.

12 Claims, 7 Drawing Sheets

| VEHICLE DATA NAME | MIN VALUE (CORRESPONDING TO COORDINATE '0') | MAX VALUE (CORRESPONDING TO COORDINATE '10000') |
|---|---|---|
| BATTERY VOLTAGE | 0V | 21.6V |
| COOLANT TEMPERATURE SENSOR | 0 °C | 240 °C |
| AIR FLOW SENSOR | 0kg/h | 2800kg/h |
| BAROMETRIC SENSOR VOLTAGE | 0V | 12V |
| THROTTLE POSITION VOLTAGE-1 | 0V | 19V |
| ACCELERATOR PEDAL SENSOR VOLTAGE-1 | 0mV | 1500mV |
| AIR CONDITIONER PRESSURE | 0kPa | 6000kPa |
| OXYGEN SENSOR-B1/S1 VOLTAGE | 0V | 3.3V |
| AIR FUEL RATIO LEARNING CONTROL | 0% | 240% |
| FUEL PRESSURE VOLTAGE | 0V | 18.3V |

APPARATUS AND METHOD FOR MONITORING ABNORMAL STATE OF VEHICLE USING CLUSTERING TECHNIQUE

CROSS REFERENCE TO RELATED APPLICATION

This application claims the benefit of Korean Patent Application No. 10-2012-0047514, filed on May 4, 2012, which is hereby incorporated by reference in its entirety into this application.

BACKGROUND OF THE INVENTION

1. Technical Field

The present invention relates generally to an apparatus and method for monitoring the abnormal state of a vehicle using a clustering technique. More particularly, the present invention relates to an apparatus and method for monitoring the abnormal state of a vehicle by applying a clustering technique to data collected from an electronic control unit mounted on a vehicle that is running.

2. Description of the Related Art

A vehicle is a very complicated and delicate machine composed of tens of thousands of mechanical parts and has changed from being a mechanical device into being an electronic device due to the introduction of electronic components. In particular, vehicles have been developed into safer and more efficient means of transportation as a result of such changes.

An electronic control system, such as an Electronic Control Unit (ECU), has been introduced to vehicles that have recently been produced, and pieces of data about individual detailed devices based on the engine of a vehicle are measured through such an electronic control system. The pieces of measured data not only can be used for the electronic control of the vehicle, but also can be collected, analyzed and managed by a server that manages the vehicle using communication technology. Information about each vehicle may enable efficient vehicle maintenance to be performed through continuous management, and may be applied to detailed fields related to vehicle driving, such as automobile insurance, logistics, traffic, and environments. Further, when an abnormality occurs in a vehicle, the state of the vehicle can be remotely diagnosed based on the information about the vehicle, and action can be taken in certain situations to promptly cope with a given situation, thus improving the safety of the vehicle and reducing a loss of lives caused by accidents.

However, technology for monitoring the state of a vehicle through the analysis of the Control Area Network (CAN) data of the vehicle is limitedly applied only to a specific device of a vehicle at the present time, as disclosed in Korean Unexamined Patent Publication No. 10-2004-0033454 (entitled "System and method for predicting the turning-off of an engine"). For example, the application of technology is limited only to some devices, such as for the lifespan of a battery or a vehicle, and technology for monitoring the state of the vehicle in response to complex factors of several devices using the CAN data of the vehicle at a remote server is insufficient.

Figure 1:
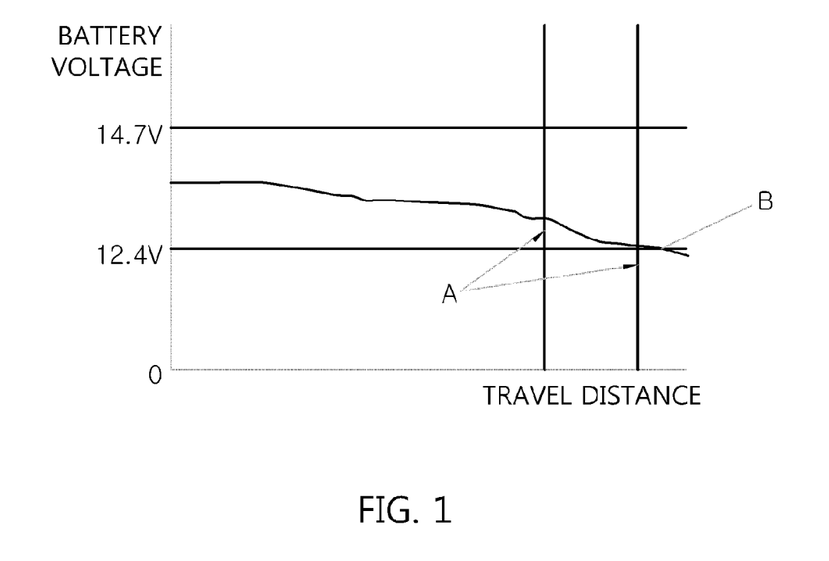
FIG. 1 is a graph applied to a conventional method in which a module for diagnosing the state of a vehicle monitors the voltage state of a battery.

For example, methods of monitoring or diagnosing the state of a vehicle presented in a vehicle maintenance system function to continuously observe vehicle data, such as the travel distance, oil pressure over time, and battery voltage of each vehicle, monitor the state of the vehicle which is approaching a time point (threshold) at which the abnormal state of the corresponding device statistically occurs, and notify a vehicle driver or a vehicle management system of the monitored state. FIG. 1 is a graph applied to a method in which a module for diagnosing the state of a vehicle monitors the state of a battery voltage. Referring to FIG. 1, 'A' denotes an area indicative of a state which the battery voltage is approaching that of a time point 'B' at which an abnormality statistically occurs in the battery while the module for diagnosing the state of the vehicle is continuously observing the battery voltage.

Further, in the case of methods of predicting the lifespan of a vehicle, there has been proposed a method of estimating a daily average mileage of the vehicle and predicting a vehicle lifespan inversely proportional to the daily average mileage. Such a prediction method is a simple method used to predict an abnormality in the specific device of a vehicle or predict the lifespan of parts or devices, and is problematic in that it is impossible to monitor an abnormal state occurring due to complex factors and correlations between a plurality of devices constituting the vehicle. In order to solve this problem, normalization is required in which pieces of data about respective devices having different thresholds are considered, and technology for applying correlations to a monitoring and diagnostic model is also required.

SUMMARY OF THE INVENTION

Accordingly, the present invention has been made keeping in mind the above problems occurring in the prior art, and an object of the present invention is to provide an apparatus and method for monitoring the abnormal state of a vehicle by applying a clustering technique to data collected from an electronic control unit mounted on a vehicle that is running.

In accordance with an aspect of the present invention to accomplish the above object, there is provided a method for monitoring an abnormal state of a vehicle using a clustering technique, including transforming Control Area Network (CAN) data collected from an Electronic Control Unit (ECU) mounted on the vehicle into coordinates in correspondence with a range of clustering coordinates; applying the coordinates to a distribution map in a specific space, calculating a number of clusters based on results of the application, and selecting an initial center point corresponding to the number of clusters; performing clustering based on the initial center point, and then generating a plurality of clusters; extracting at least one piece of data from each of the plurality of clusters, and deciding on a state feature of a corresponding cluster using a difference between maximum and minimum values of attributes constituting the at least one piece of data; and monitoring a current state of the vehicle based on current CAN data of the vehicle and respective state features of the plurality of clusters.

Preferably, the CAN data of the vehicle may be data corresponding to a battery voltage, a sensed value of a coolant temperature sensor, a sensed value of an air flow sensor, a throttle position voltage, a voltage of an accelerator pedal sensor, an air conditioner pressure, a sensed value of an oxygen sensor, air fuel ratio learning control, a sensed value of a barometric pressure sensor, and fuel pressure of the vehicle.

Preferably, generating the plurality of clusters may include generating an initial cluster by grouping pieces of CAN data located within a preset radius around the initial center point; calculating a new center point based on pieces of CAN data constituting the initial cluster; generating clusters by grouping pieces of CAN data located within a preset radius around the new center point; and calculating a center point of each generated cluster until the center point of the generated cluster is identical to the new center point.

Preferably, calculating the center point of each generated cluster until the center point of the generated cluster may be identical to the new center point may include, if the center point of the generated cluster is identical to the new center point, analyzing distances from the center point of the generated cluster to pieces of CAN data constituting the cluster; and removing noise data using results of the analysis of the distances, and then converting noise data-removed results into partial clusters.

Preferably, deciding on the state feature may include deciding on a representative attribute of the corresponding cluster by determining whether the difference between the maximum and minimum values of the attributes constituting the at least one piece of data falls within a preset threshold range; and deciding on the state feature of the cluster using the representative attribute of the cluster and information about an abnormal state of the vehicle.

Preferably, monitoring the current state of the vehicle may include searching for a cluster having a state feature identical to that of coordinates corresponding to the current CAN data of the vehicle; determining whether a state feature of a found cluster corresponds to a normal state; if it is determined that the state feature of the found cluster corresponds to the normal state, terminating a monitoring operation; and if it is determined that the state feature of the found cluster corresponds to an abnormal state, notifying a vehicle driver of a danger.

Preferably, the method may further include, if there is no cluster having the state feature identical to that of the coordinates corresponding to the current CAN data of the vehicle at the searching for the cluster having the identical state feature, searching a specific space, in which the coordinates corresponding to the current CAN data of the vehicle are located, for a normal state cluster and an abnormal state cluster located within a preset radius; analyzing a state of the vehicle based on a distance from a center point of the normal state cluster to a center point of the abnormal state cluster; and providing results of the analysis of the vehicle state to the vehicle driver.

In accordance with another aspect of the present invention to accomplish the above object, there is provided an apparatus for monitoring an abnormal state of a vehicle using a clustering technique, including a coordinate transformation unit for transforming Control Area Network (CAN) data collected from an Electronic Control Unit (ECU) mounted on the vehicle into coordinates in correspondence with a range of clustering coordinates; a clustering unit for applying the coordinates to a distribution map in a specific space, calculating a number of clusters based on results of the application, and generating a plurality of clusters by performing clustering based on an initial center point corresponding to the number of clusters; a feature decision unit for extracting at least one piece of data from each of the plurality of clusters, and deciding on a state feature of a corresponding cluster using a difference between maximum and minimum values of attributes constituting the at least one piece of data; and a monitoring unit for monitoring a current state of the vehicle based on current CAN data of the vehicle and respective state features of the plurality of clusters.

Preferably, the clustering unit may be configured to generate an initial cluster by grouping pieces of CAN data located within a preset radius around the initial center point, calculate a new center point based on pieces of CAN data constituting the initial cluster, and generate clusters by grouping pieces of CAN data located within a preset radius around the new center point.

Preferably, the clustering unit may calculate a center point of each generated cluster until the center point of the generated cluster is identical to the new center point.

Preferably, the apparatus may further include an attribute decision unit for extracting at least one piece of data from each of the plurality of clusters, calculating a difference between maximum and minimum values of attributes constituting the at least one piece of data, checking whether the calculated difference falls within a preset threshold range, and deciding on a representative attribute of the cluster based on results of the checking.

Preferably, the feature decision unit may decide on a state feature of the corresponding cluster using the representative attribute and information about an abnormal state of the vehicle.

Preferably, the monitoring unit may be configured to search for a cluster having a state feature identical to that of coordinates corresponding to the current CAN data of the vehicle, and determine whether a state feature of a found cluster corresponds to a normal state.

Preferably, if it is determined that the state feature of the found cluster corresponds to the normal state, a monitoring operation may be terminated, whereas if it is determined that the state feature of the found cluster corresponds to an abnormal state, a vehicle driver may be notified of a danger.

Preferably, if there is no cluster having the state feature identical to that of the coordinates corresponding to the current CAN data of the vehicle, a specific space in which the coordinates corresponding to the current CAN data of the vehicle are located may be searched for a normal state cluster and an abnormal state cluster located within a preset radius, a state of the vehicle may be analyzed based on a distance from a center point of the normal state cluster to a center point of the abnormal state cluster, and results of the analysis of the vehicle state may be provided to the vehicle driver.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, an apparatus and method for monitoring the abnormal state of a vehicle using a clustering technique according to embodiments of the present invention will be described in detail with reference to the attached drawings.

Figure 2:
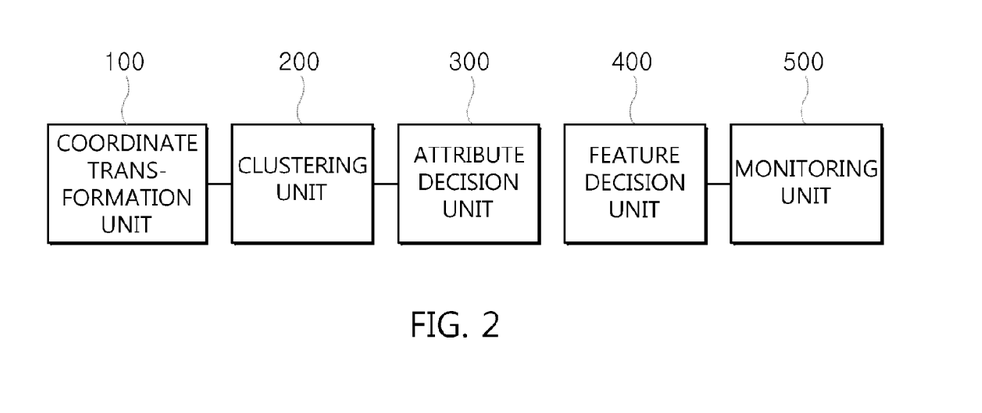
FIG. 2 is a block diagram schematically showing the configuration of an apparatus for monitoring the abnormal state of a vehicle using a clustering technique according to an embodiment of the present invention.

FIG. 2 is a block diagram schematically showing the configuration of an apparatus for monitoring the abnormal state of a vehicle using a clustering technique according to an embodiment of the present invention.

Referring to FIG. 2, the apparatus for monitoring the abnormal state of a vehicle using a clustering technique includes a coordinate transformation unit 100, a clustering unit 200, an attribute decision unit 300, a feature decision unit 400, and a monitoring unit 500.

The coordinate transformation unit 100 transforms pieces of Control Area Network (CAN) data collected from an Electronic Control Unit (ECU) mounted on the vehicle into coordinates in consideration of a preset range of clustering coordinates. Here, the CAN data corresponds to a battery voltage, a sensed value of a coolant temperature sensor, a sensed value of an air flow sensor, a throttle position voltage, a voltage of an accelerator pedal sensor, an air conditioner pressure, a sensed value of an oxygen sensor, air-fuel ratio learning control, a sensed value of a biometric pressure sensor, and a fuel pressure.

The clustering unit 200 calculates the number of clusters by applying the coordinates transformed by the coordinate transformation unit 100 to a distribution map analysis algorithm in a multidimensional space, and selects arbitrary CAN data corresponding to the calculated number of clusters as an initial center point. Next, the clustering unit 200 generates K clusters by applying the selected initial center point to a K-means clustering algorithm, removes noise data from the K clusters, and converts noise-removed results into partial clusters.

The attribute decision unit 300 extracts at least one piece of data from each cluster, calculates a difference between the maximum and minimum values of individual attributes constituting the extracted at least one piece of data, checks whether the calculated difference falls within a preset threshold range, and then decides on a representative attribute of the corresponding cluster based on the results of the checking.

The feature decision unit 400 decides on the state feature of the cluster using the representative attribute of the cluster decided on by the attribute decision unit 300 and information about the abnormal state of the vehicle.

The monitoring unit 500 monitors the current state of the vehicle using current vehicle data received from a server based on cluster data including the K clusters, the representative attributes of the respective clusters, and the state features of the clusters.

Next, a method for monitoring the abnormal state of a vehicle using a clustering technique will be described in detail with reference to FIG. 3.

Figure 3:
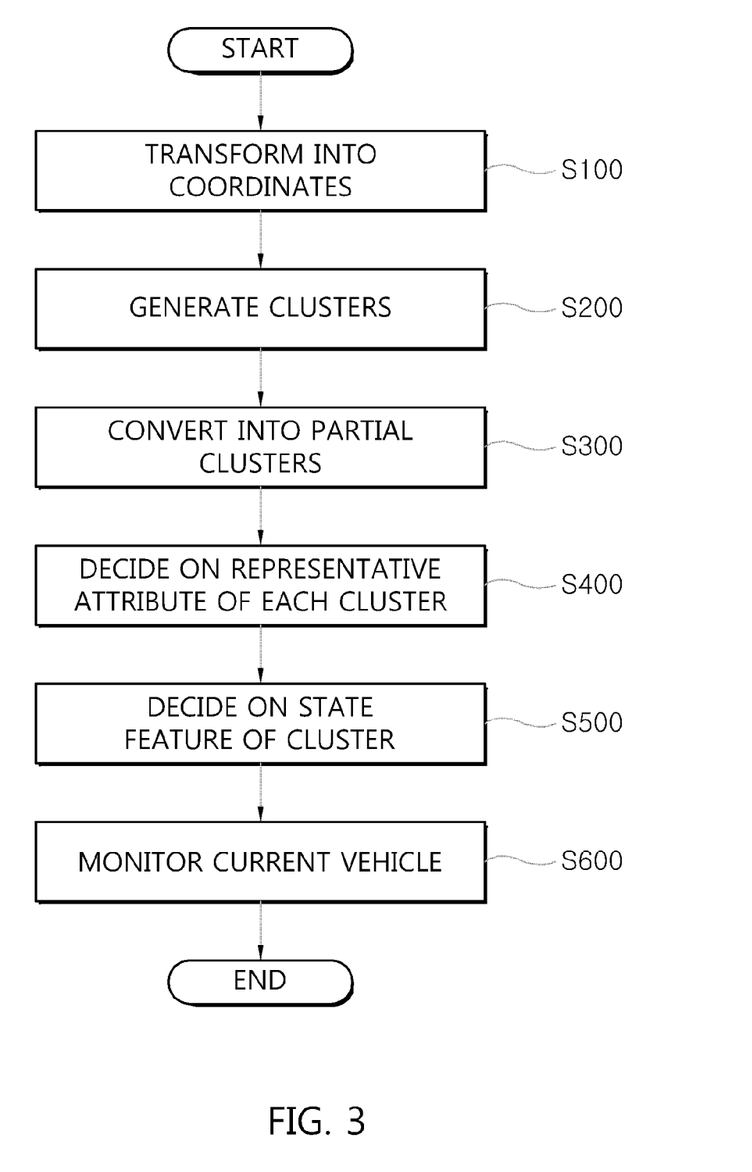
FIG. 3 is a flowchart showing a method for monitoring the abnormal state of a vehicle using a clustering technique according to an embodiment of the present invention.

FIG. 3 is a flowchart showing a method for monitoring the abnormal state of a vehicle using a clustering technique according to an embodiment of the present invention.

Referring to FIG. 3, the apparatus for monitoring the abnormal state of the vehicle using the clustering technique transforms pieces of CAN data collected from an ECU mounted on the vehicle into coordinates in consideration of the preset range of clustering coordinates at step S100.

The vehicle abnormal state monitoring apparatus using the clustering technique calculates the number of clusters by applying the coordinates transformed at step S100 to a distribution map analysis algorithm in a multidimensional space, and generates K clusters based on the calculated number of clusters at step S200. Here, the vehicle abnormal state monitoring apparatus using the clustering technique selects arbitrary CAN data corresponding to the number of clusters as an initial center point, and generates the K clusters by applying the selected initial center point to a K-means clustering algorithm.

The vehicle abnormal state monitoring apparatus using the clustering technique removes noise data from the K clusters generated at step S200, and converts noise data-removed results into partial clusters at step S300.

The vehicle abnormal state monitoring apparatus using the clustering technique extracts at least one piece of data from each cluster, calculates a difference between the maximum and minimum values of individual attributes constituting the extracted at least one piece of data, checks whether the calculated difference falls within a preset threshold range, and then decides on a representative attribute of the corresponding cluster based on the results of the checking at step S400.

The vehicle abnormal state monitoring apparatus using the clustering technique decides on the state feature of the cluster using the representative attribute of the cluster decided on at step S400 and information about the abnormal state of the vehicle at step S500.

The vehicle abnormal state monitoring apparatus using the clustering technique may construct cluster data through steps S100 to S500. Here, the cluster data includes the K clusters, the representative attributes of respective clusters, and the state features of the clusters.

The vehicle abnormal state monitoring apparatus using the clustering technique monitors the current state of the vehicle using vehicle data received from the server based on the cluster data constructed in this way at step S600.

As in the case of step S500, the method for monitoring the abnormal state of the vehicle using the received vehicle data based on the constructed cluster data is configured to transform the vehicle data received from the server into coordinates, extract clusters having higher correlation through the analysis of distances from the locations of pieces of cluster data constructed using the transformed coordinates in the multidimensional space to the center points of the respective clusters, and analyze the state of the vehicle based on the extracted results.

If all pieces of CAN data received from the vehicle to be targeted are used to perform step S500 of monitoring the abnormal state of the vehicle in the present invention, a processing time increases, and thus the state of the vehicle may be monitored using only minimum input data by analyzing specific CAN data.

Figure 4:
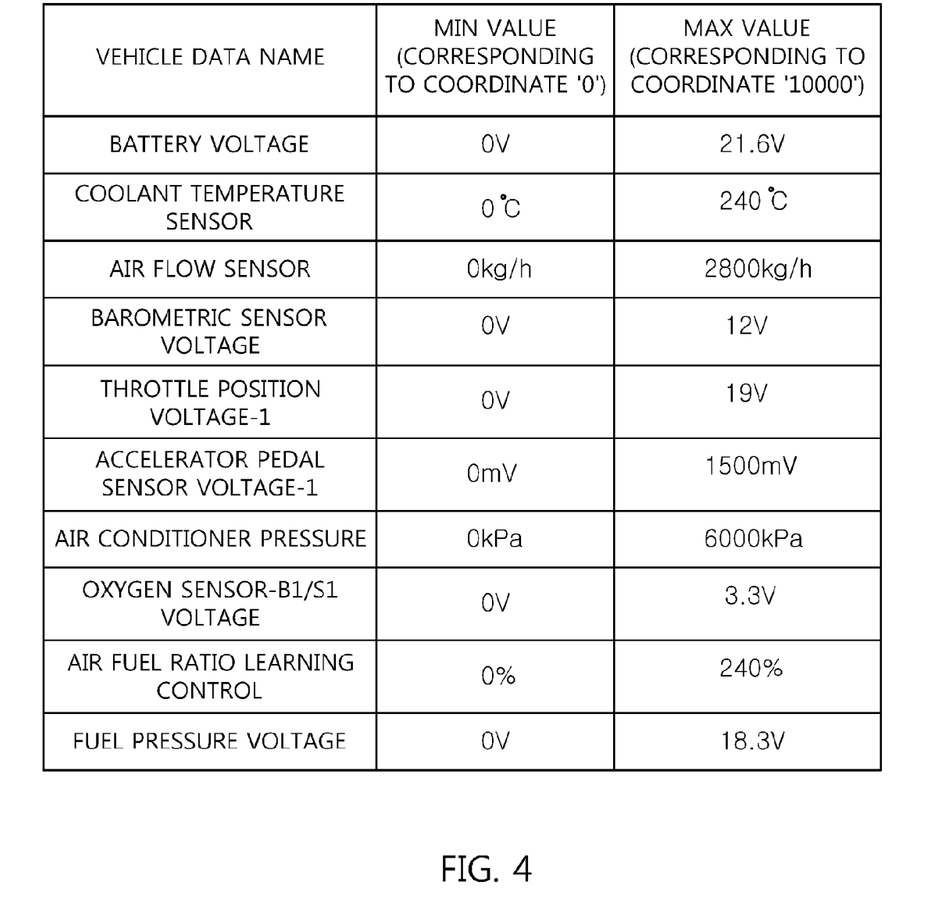
FIG. 4 is a diagram showing CAN data of a vehicle according to an embodiment of the present invention.

For example, among pieces of CAN data of FIG. 4, second CAN data to fifth CAN data (see Table 1) correspond to CAN data about the state of a battery. Since current decreases and a charging state decreases with a decrease in the voltage of the battery, the battery voltage alone may represent the pieces of CAN data about the battery state. Therefore, the state of the battery may be sufficiently monitored using only the battery voltage for the pieces of CAN data about the battery state.

Further, among the pieces of CAN data of FIG. 4, 38th CAN data to 43rd CAN data (see Table 1) correspond to CAN data about the ignition time of the vehicle. The ignition time of the vehicle denotes a position at which the crankshaft of an engine reaches an ignition point, and denotes data appearing as a waveform because the period of the ignition time is very short. Since the data having the form of an angle or a waveform does not have a threshold, it is not suitable for the monitoring of the state of the vehicle. Further, since data adjusted by the ECU for controlling the engine in an electronic manner is adjusted according to the ratio, it is not suitable for the monitoring of the state of the vehicle, either.

Therefore, the CAN data of the vehicle must be a value representing devices for measuring the CAN data, and must have a threshold.

Next, a process for applying the method for monitoring the abnormal state of a vehicle using a clustering technique to the vehicle according to an embodiment of the present invention will be described in detail with reference to FIG. 5.

Figure 5:
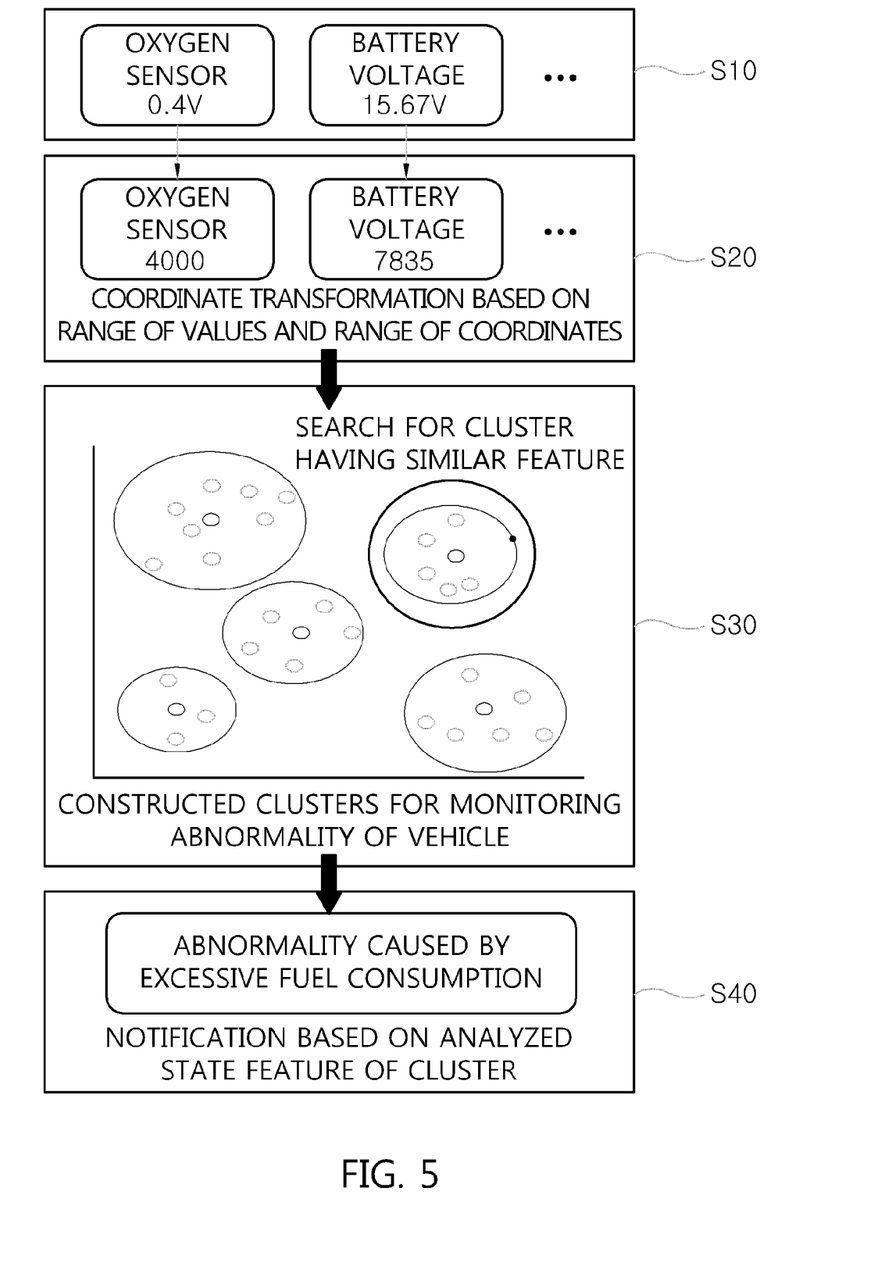
FIG. 5 is a diagram showing a process for applying the method for monitoring the abnormal state of a vehicle using a clustering technique to the vehicle according to an embodiment of the present invention.

FIG. 5 is a diagram showing a process for applying the method for monitoring the abnormal state of the vehicle using the clustering technique to the vehicle according to an embodiment of the present invention.

Referring to FIG. 5, the vehicle abnormal state monitoring apparatus using the clustering technique receives current vehicle data, for example, sensed results of an oxygen sensor (e.g., a voltage of 0.4 V) and a battery voltage (15.67 V), from the server at step S10.

The vehicle abnormal state monitoring apparatus using the clustering technique transforms the sensed results of the oxygen sensor (e.g., 0.4 V) and the battery voltage (15.67 V) into coordinates in consideration of the range of clustering coordinates at step S20. The range (MIN, MAX) of pieces of data transformed into coordinates, among the pieces of vehicle data according to the embodiment of the present invention is given in the following Table 1.

TABLE 1

| No. | CAN data name of vehicle |
| --- | --- |
| 1 | Malfunction Indicator Lamp (MIL) of engine |
| 2 | Battery voltage |
| 3 | Battery sensor current |
| 4 | Battery sensor temperature |
| 5 | Battery sensor charging state |
| 6 | Main relay state |
| 7 | Coolant temperature sensor |
| 8 | Engine oil temperature |
| 9 | Air flow sensor |
| 10 | Air temperature sensor |
| 11 | Manifold pressure sensor |
| 12 | Barometric pressure sensor |
| 13 | Engine RPM |
| 14 | Target idle speed |
| 15 | Idle state |
| 16 | Vehicle speed sensor |
| 17 | Throttle position sensor angle-1 |
| 18 | Throttle position voltage-1 |
| 19 | Throttle position sensor angle-2 |
| 20 | Throttle position voltage-2 |
| 21 | Accelerator position sensor 1 |
| 22 | Accelerator pedal sensor voltage-1 |
| 23 | Accelerator position sensor 2 |
| 24 | Accelerator pedal sensor voltage-2 |
| 25 | Power steering pressure sensor |
| 26 | Evaporation gas valve duty |
| 27 | Air conditioner switch |
| 28 | Air conditioner status |
| 29 | Air conditioner pressure |
| 30 | Cooling pan-PWM control |
| 31 | Brake pedal switch |
| 32 | Brake lamp switch |
| 33 | Fuel pump status |
| 34 | Fuel pressure |
| 35 | Fuel level sensor |

TABLE 1-continued

| No. | CAN data name of vehicle |
| --- | --- |
| 36 | Fuel level sensor |
| 37 | Torque control request |
| 38 | Ignition time-CYL1 |
| 39 | Ignition time-CYL2 |
| 40 | Ignition time-CYL3 |
| 41 | Ignition time-CYL4 |
| 42 | Ignition time-CYL5 |
| 43 | Ignition time-CYL6 |
| 44 | Fuel injection time-CYL1 |
| 45 | Fuel injection time-CYL2 |
| 46 | Fuel injection time-CYL3 |
| 47 | Fuel injection time-CYL4 |
| 48 | Fuel injection time-CYL5 |
| 49 | Fuel injection time-CYL6 |
| 50 | Theoretical air fuel ratio |
| 51 | Air fuel ratio correction status (B1/S1) |
| 52 | Oxygen sensor heater current-B1/S1 |
| 53 | Oxygen sensor heater duty-B1/S1 |
| 54 | Oxygen sensor heater current-B1/S2 |
| 55 | Oxygen sensor heater duty-B1/S2 |
| 56 | Oxygen sensor heater current-B2/S1 |
| 57 | Oxygen sensor heater duty-B2/S1 |
| 58 | Oxygen sensor heater current-B2/S2 |
| 59 | Oxygen sensor heater duty-B2/S2 |
| 60 | Oxygen sensor-B1/S1 |
| 61 | Oxygen sensor-B1/S2 |
| 62 | Oxygen sensor-B2/S1 |
| 63 | Oxygen sensor-B2/S2 |
| 64 | Air fuel ratio learning control-B1 |
| 65 | Air fuel ratio learning control-B2 |
| 66 | Air fuel ratio correction control-B1 |
| 67 | Air fuel ratio correction control-B2 |
| 68 | VIS 1 operating status |
| 69 | ETC motor duty |
| 70 | Engine rotation sensing |
| 71 | MEC prevention |

For example, the battery voltage has a range from a minimum of 0 V to a maximum of 21.6 V, so that if clustering coordinates range from a minimum of 0 to a maximum of 10000, a value of 0 V, which is a minimum value of the data range, is set to a coordinate value '0,' and a value of 21.6 V is set to 10000, which is a maximum coordinate value. That is, values ranging from 0 to 20 are resolved into quantized values ranging from 0 to 10000, and the locations of the values are transformed into coordinates.

The vehicle abnormal state monitoring apparatus using the clustering technique may transform the current vehicle data into coordinates, as represented by the following Equation (1):

$$\text{location} = \frac{\text{value}}{\min \delta + \max \delta} \cdot \max \Delta \quad (1)$$

As shown in Equation (1), the coordinate value (location) may be obtained using the current vehicle data (value), the range of the corresponding data (min δ~max δ), and the range of coordinate values (max Δ).

The vehicle abnormal state monitoring apparatus using the clustering technique represents the transformed coordinates in a multidimensional space corresponding to the constructed cluster data, and searches for a cluster having coordinates similar to the transformed coordinates based on the multidimensional space at step S30.

The vehicle abnormal state monitoring apparatus using the clustering technique notifies a vehicle user of information about the current state of the vehicle, for example, a state indicative of "an abnormality caused by excessive fuel consumption," depending on the state feature of the cluster based on the results, found at step S30, at step S40.

Below, the method for monitoring the abnormal state of the vehicle using the clustering technique, shown in FIG. 3, will be described in detail with reference to FIGS. 6 to 8.

First, at step S100, pieces of CAN data collected from the ECU mounted on the vehicle are transformed into coordinates in consideration of a preset range of clustering coordinates.

At step S200, the number of clusters is calculated by applying the coordinates transformed at step S100 to a distribution map analysis algorithm in a multidimensional space, and K clusters are generated based on the calculated number of clusters.

In this way, when "K" corresponding to the number of clusters is decided on, the vehicle abnormal state monitoring apparatus using the clustering technique selects arbitrary CAN data corresponding to the number of clusters as an initial center point, and performs clustering into K clusters by applying the collected CAN data to a K-means clustering algorithm.

Figure 6:
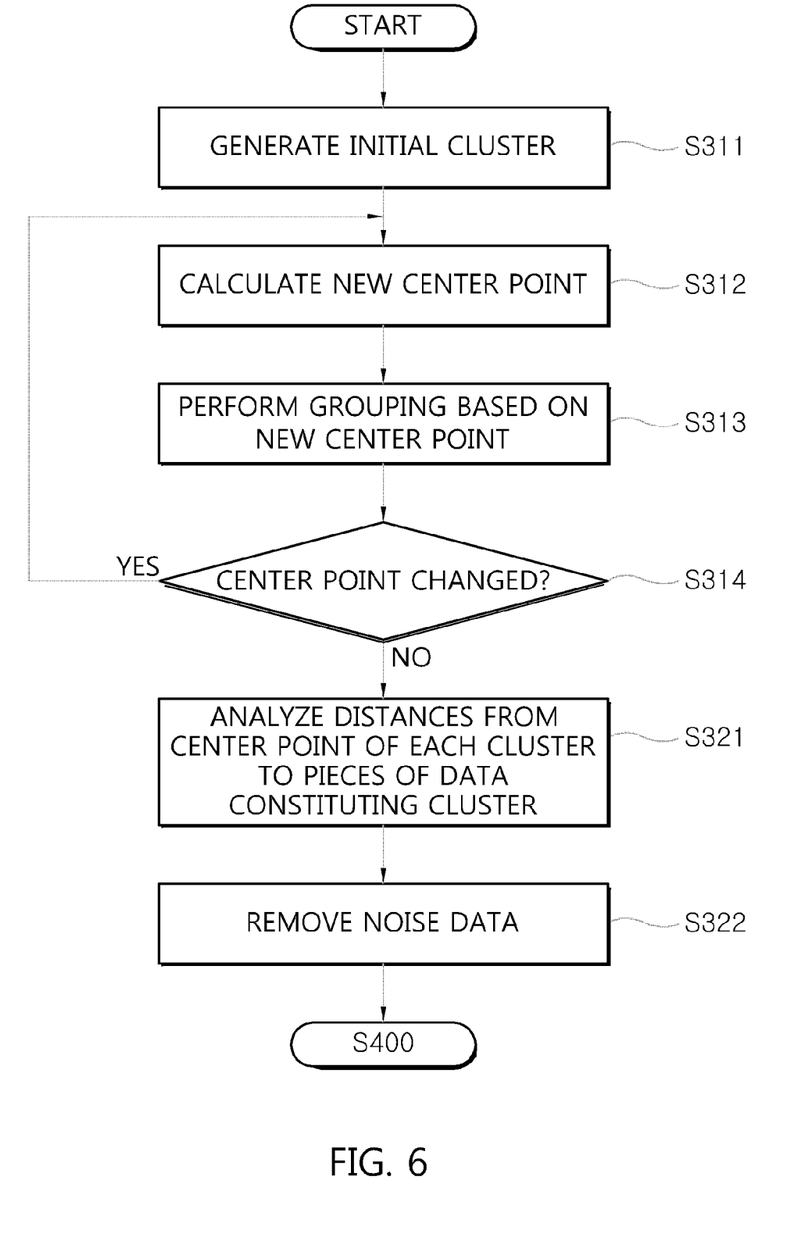
FIGS. 6 to 8 are flowcharts showing detailed methods for monitoring the abnormal state of a vehicle using a clustering technique according to an embodiment of the present invention.

Referring to FIG. 6, the vehicle abnormal state monitoring apparatus using the clustering technique generates each initial cluster by grouping pieces of CAN data located within a preset radius around the selected initial center point at step S311, and calculates a new center point based on the pieces of CAN data constituting the initial cluster at step S312. The vehicle abnormal state monitoring apparatus using the clustering technique generates clusters by grouping pieces of CAN data located within a preset radius around a new center point corresponding to each initial cluster at step S313. Until the center point of the generated cluster becomes identical to the center point calculated at step S312, the procedure of calculating a center point is repeated at step S314.

If the center point does not change, the vehicle abnormal state monitoring apparatus using the clustering technique performs the analysis of distances from the center point of each cluster generated at step S313 to the pieces of CAN data constituting the cluster at step S321, and converts noise data-removed results into partial clusters through the analysis of distances at step S322.

Figure 7:
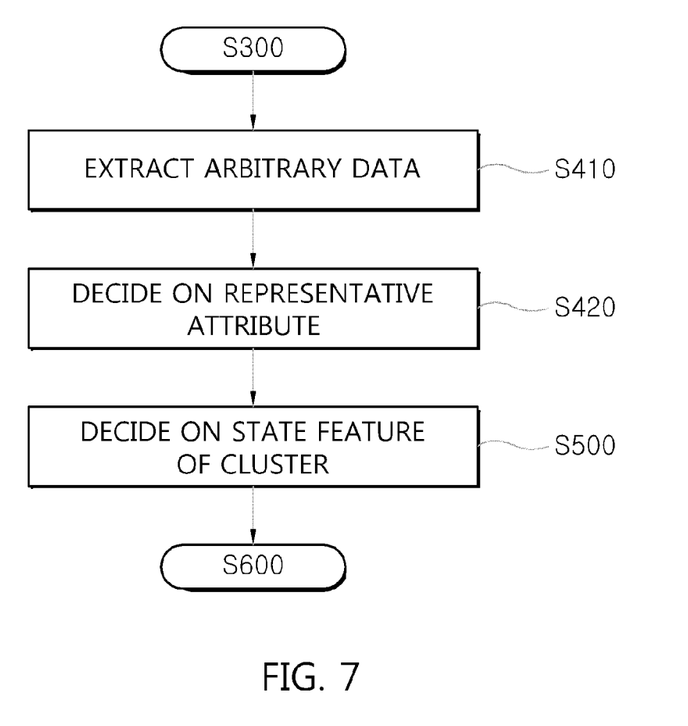
Figure 8:
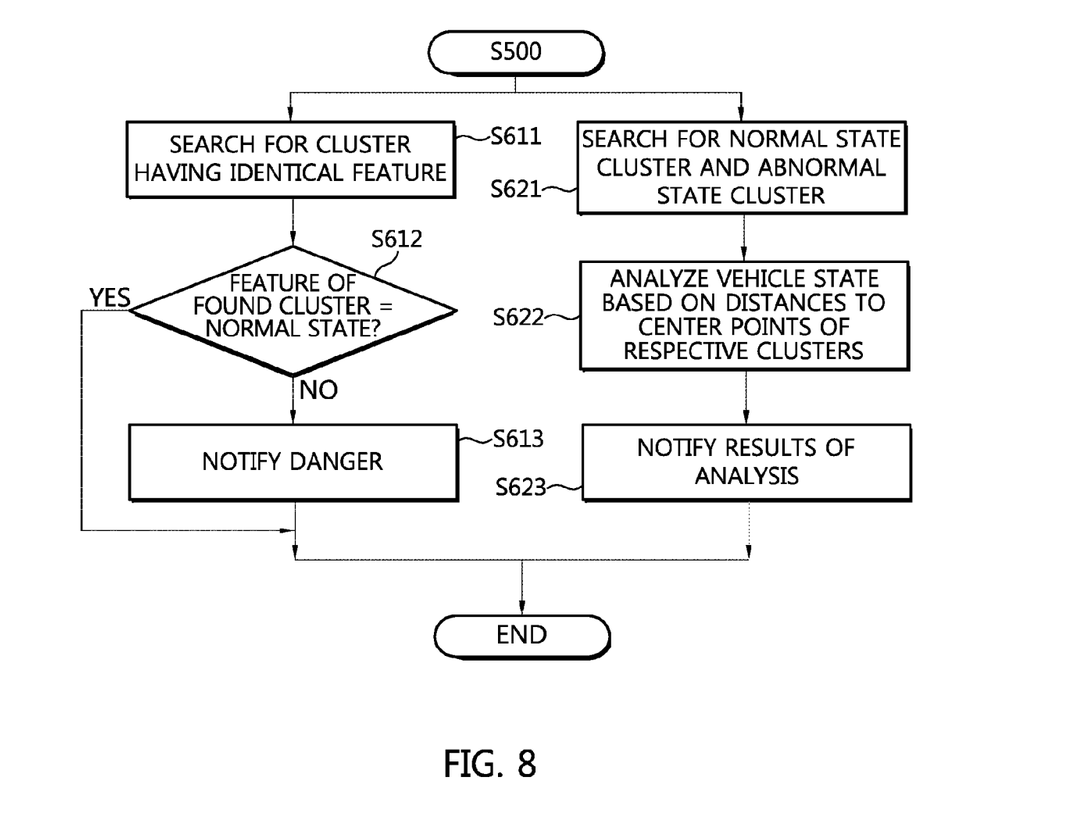

Referring to FIG. 7, the vehicle abnormal state monitoring apparatus using the clustering technique extracts at least one piece of data from each cluster at step S410, calculates a difference between the maximum value and the minimum value of individual attributes constituting the extracted at least one piece of data, and decides on the representative attribute of the corresponding cluster by determining whether the calculated difference falls within a preset threshold range at step S420.

The vehicle abnormal state monitoring apparatus using the clustering technique decides on the state feature of the cluster using the representative attribute of the cluster and information about the abnormal state of the vehicle at step S500.

Through the above procedure, the vehicle abnormal state monitoring apparatus using the clustering technique constructs cluster data including K clusters, representative attributes of the clusters, and state features of the clusters.

Next, the vehicle abnormal state monitoring apparatus using the clustering technique transforms current vehicle data into coordinates, as in the case of step S10 in FIG. 5, so as to monitor current vehicle data based on the constructed cluster data.

The vehicle abnormal state monitoring apparatus using the clustering technique searches for a cluster having a state feature identical to that of coordinates corresponding to the current vehicle data at step S611.

The vehicle abnormal state monitoring apparatus using the clustering technique determines whether the state feature of the cluster found at step S611 corresponds to a normal state at step S612.

The vehicle abnormal state monitoring apparatus using the clustering technique is configured to, if it is determined that the state feature corresponds to the normal state, terminate the monitoring of the state of the vehicle, whereas if it is determined that the state feature corresponds to an abnormal state, notify a vehicle driver of a danger due to the vehicle being in an abnormal state or having a high probability of being in the abnormal state at step S613.

The vehicle abnormal state monitoring apparatus using the clustering technique is configured to, if there is no cluster having a state feature identical to that of the coordinates corresponding to the current vehicle data, search the multidimensional space, in which the coordinates are located, for the closest normal state cluster and the closest abnormal state cluster at step S621. Here, the vehicle abnormal state monitoring apparatus using the clustering technique designates a preset radius in the multidimensional space in which the coordinates corresponding to the current vehicle data are located, and is then capable of searching for the closest normal state cluster and the closest abnormal state cluster.

The vehicle abnormal state monitoring apparatus using the clustering technique analyzes the state of the vehicle based on a distance from the center point of the normal state cluster to the center point of the abnormal state cluster at step S622.

The vehicle abnormal state monitoring apparatus using the clustering technique notifies the vehicle driver or a specific vehicle management server of the results of the analysis at step S622 at step S623.

In this way, the present invention monitors an abnormal state that may occur in a vehicle that is actually running, using a data mining technique. The present invention monitors the abnormal state of the vehicle and analyzes a dangerous level by applying pieces of CAN data of the vehicle to a clustering technique, which is one of effective data mining techniques, in consideration of correlations between the pieces of CAN data of the vehicle used for the ECU of the vehicle and information based on the individual features of the CAN data, notifies a vehicle driver or a vehicle management server of the results of the analysis, and then detects abnormalities that may occur in the vehicle. As a result, the present invention may prevent the occurrence of a dangerous situation and take suitable action in response to the dangerous situation, thus contributing to safe driving of the vehicle, the prevention of the occurrence of accidents, and the protection of occupants' lives. Further, the present invention may detect inefficient consumption of fuel or excessive discharge of exhaust gas of the vehicle, and then also contribute to the protection of environment and preservation of energy. Furthermore, the present invention may provide important information from the standpoint of vehicle driving, history management, and accident prevention in fields related to vehicles, such as insurance companies and transport companies.

As described above, in accordance with embodiments of the present invention, the vehicle abnormal state monitoring apparatus and method using the clustering technique are configured to monitor the state of a vehicle by applying a clustering technique to data collected from an electronic control unit mounted on a vehicle that is running. Accordingly, the present invention may notify a vehicle driver or a specific vehicle management server of the results of the monitoring, thus preventing abnormalities that may occur in the vehicle or taking suitable action in response to the abnormalities. As a result, the present invention may contribute to safe driving of the vehicle, the prevention of the occurrence of accidents, and the protection of occupants' lives.

Further, in accordance with the embodiments of the present invention, the vehicle abnormal state monitoring apparatus and method using the clustering technique are configured to detect inefficient consumption of fuel or excessive discharge of exhaust gas of the vehicle, and then also contribute to the protection of environment and preservation of energy. Furthermore, the present invention may provide important information from the standpoint of vehicle driving, history management, and accident prevention in fields related to vehicles, such as insurance companies and transport companies.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A method for monitoring an abnormal state of a vehicle using a clustering technique, comprising:
    transforming, using a hardware computing device, Control Area Network (CAN) data collected from an Electronic Control Unit (ECU) mounted on the vehicle, into coordinates on a distribution map in a multidimensional space, in accordance with a range of the coordinates on the distribution map;
    analyzing, using the hardware computing device, the distribution map to thereby determine a number of clusters to be formed, and selecting the determined number of initial center points for forming the clusters;
    clustering, using the hardware computing device, the coordinates on the distribution map based on the initial center points, to thereby generate the clusters;
    extracting, using the hardware computing device, at least one piece of data from each of the clusters, and calculating, for each cluster, a state feature using a difference between maximum and minimum values of an attribute of the at least one piece of data; and
    monitoring, using the hardware computing device, a current state of the vehicle based on current CAN data of the vehicle and the state features of the generated clusters, including
        finding, using the hardware computing device, one of the generated clusters that has a state feature identical to a state feature of a cluster corresponding to coordinates transformed from the current CAN data; and
        determining, using the hardware computing device, whether the state feature of the found cluster corresponds to a normal state,
            upon determining that the state feature of the found cluster corresponds to the normal state, terminating the monitoring; and
            upon determining that the state feature of the found cluster corresponds to an abnormal state, notifying a vehicle driver of a danger.

2. The method of claim 1, wherein the CAN data of the vehicle is data corresponding to a battery voltage, a sensed value of a coolant temperature sensor, a sensed value of an air flow sensor, a throttle position voltage, a voltage of an accelerator pedal sensor, an air conditioner pressure, a sensed value of an oxygen sensor, air fuel ratio learning control, a sensed value of a barometric pressure sensor, and fuel pressure of the vehicle.

3. The method of claim 1, wherein the clustering the coordinates comprises, for each of the initial center points,
    generating an initial cluster by grouping ones of the coordinates located within a preset radius around said each initial center point;
    calculating a new center point based on the coordinates constituting the initial cluster;
    generating a new cluster by grouping ones of the coordinates located within a preset radius around the new center point; and
    calculating a center point of the new cluster, and repeating the generating and calculating steps unless the center point of the new cluster is identical to the new center point.

4. The method of claim 3, wherein the repeating the generating and calculating steps unless the center point of the new cluster is identical to the new center point comprises:
    if the center point of the new cluster is identical to the new center point, analyzing distances from the center point of the new cluster to the coordinates constituting the new cluster; and
    removing ones of the coordinates corresponding to noise data based on a result of the analysis of the distances, and then converting the remaining coordinates constituting the new cluster into another new cluster.

5. The method of claim 1, wherein the calculating a state feature for each cluster comprises:
    deciding on a representative attribute of said each cluster by determining an attribute of which a difference between the maximum and minimum values falls within a preset threshold range; and
    deciding on the state feature of the cluster using the representative attribute and information about an abnormal state of the vehicle.

6. The method of claim 1, further comprising, if there is no cluster having the state feature identical to that of the cluster corresponding to the coordinates transformed from the current CAN data of the vehicle:
    searching a multidimensional space in which the coordinates transformed from the current CAN data of the vehicle are located for a normal state cluster and an abnormal state cluster located within a preset radius;
    analyzing a state of the vehicle based on a distance from a center point of the normal state cluster to a center point of the abnormal state cluster; and
    providing a result of the analysis of the vehicle state to the vehicle driver.

7. An apparatus for monitoring an abnormal state of a vehicle using a clustering technique, comprising:
    a hardware computing device; and
    a storage medium containing program instructions, the execution of which by the hardware computing device causes the apparatus to provide functions of:
        a coordinate transformation unit for transforming Control Area Network (CAN) data, collected from an Electronic Control Unit (ECU) mounted on the vehicle, into coordinates on a distribution map in a multidimensional space, in accordance with a range of the coordinates on the distribution map;
        a clustering unit for analyzing the distribution map to thereby determine a number of clusters to be generated, and generating the clusters by clustering the coordinates on the distribution map based on initial center points corresponding to the determined number of clusters;

a feature decision unit for extracting at least one piece of data from each of the clusters, and calculating, for each cluster, a state feature using a difference between maximum and minimum values of an attribute of the at least one piece of data; and a monitoring unit for monitoring a current state of the vehicle based on current CAN data of the vehicle and the state features of the generated clusters, including finding one of the generated clusters that has a state feature identical to a state feature of a cluster corresponding to coordinates transformed from the current CAN data; and determining whether the state feature of the found cluster corresponds to a normal state, upon determining that the state feature of the found cluster corresponds to the normal state, terminating the monitoring; and upon determining that the state feature of the found cluster corresponds to an abnormal state, notifying a vehicle driver of a danger.

8. The apparatus of claim 7, wherein the clustering unit is configured to generate, for each of the initial center points, an initial cluster by grouping ones of the coordinates located within a preset radius around said each initial center point, calculate a new center point based on the coordinates constituting the initial cluster, and generate clusters by grouping ones of the coordinates located within a preset radius around the new center point.

9. The apparatus of claim 8, wherein the clustering unit calculates a center point of each generated cluster until the center point of the generated cluster is identical to the new center point.

10. The apparatus of claim 7, further comprising an attribute decision unit for extracting the at least one piece of data from each of the clusters, calculating a difference between maximum and minimum values of each attribute of the at least one piece of data, checking whether the calculated difference falls within a preset threshold range, and deciding on a representative attribute of the cluster based on a result of the checking.

11. The apparatus of claim 10, wherein the feature decision unit decides on a state feature of a cluster using the representative attribute of the cluster and information about an abnormal state of the vehicle.

12. The apparatus of claim 7, wherein if there is no cluster having the state feature identical to that of the cluster corresponding to the coordinates transformed from the current CAN data of the vehicle, a multidimensional space in which the coordinates transformed from the current CAN data of the vehicle are located is searched for a normal state cluster and an abnormal state cluster located within a preset radius, a state of the vehicle is analyzed based on a distance from a center point of the normal state cluster to a center point of the abnormal state cluster, and a result of the analysis of the vehicle state is provided to the vehicle driver.

\* \* \* \* \*